US010936993B2

(12) United States Patent
Essenmacher et al.

(10) Patent No.: US 10,936,993 B2
(45) Date of Patent: Mar. 2, 2021

(54) AUTOMATED INVENTORY REPLENISHMENT

(71) Applicant: International Business Machines Corporation, Armonk, NY (US)

(72) Inventors: Michael D. Essenmacher, Danbury, CT (US); Anthony M. Cocuzza, Poughkeepsie, NY (US); Nancy S. Tilley, High Falls, NY (US); Janice M. Young, White Plains, NY (US); Yuk L. Chan, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 15/806,427

(22) Filed: Nov. 8, 2017

(65) Prior Publication Data

US 2019/0138976 A1    May 9, 2019

(51) Int. Cl.
*G06Q 10/08*        (2012.01)
*G06F 16/9537*     (2019.01)

(52) U.S. Cl.
CPC ....... *G06Q 10/087* (2013.01); *G06F 16/9537* (2019.01); *G06Q 10/083* (2013.01)

(58) Field of Classification Search
None
See application file for complete search history.

(56) References Cited

U.S. PATENT DOCUMENTS

| 6,643,556 | B1  | 11/2003 | Morenz et al. |
| 6,715,514 | B2* | 4/2004  | Parker, III ............. G06Q 10/08 |
|           |     |         | 141/1 |
| 8,050,942 | B1  | 11/2011 | Ali et al. |
| 8,887,990 | B2* | 11/2014 | Grant ................... G06Q 50/02 |
|           |     |         | 235/375 |
| 9,858,583 | B2* | 1/2018  | Sobalvarro ......... H04M 1/7253 |
| 2003/0216969 | A1* | 11/2003 | Bauer ..................... H01Q 7/00 |
|           |     |         | 705/22 |
| 2006/0220789 | A1 | 10/2006 | Suzuki et al. |
| 2007/0152048 | A1 | 7/2007 | Jung et al. |
| 2008/0035727 | A1 | 2/2008 | Stanzel et al. |
| 2010/0090004 | A1* | 4/2010 | Sands ................. G06Q 10/087 |
|           |     |         | 235/385 |

(Continued)

FOREIGN PATENT DOCUMENTS

| CN | 201808857 U | 4/2011 |
| WO | 2008103820 A2 | 8/2008 |

OTHER PUBLICATIONS

Essenmacher et al., "Automated Inventory Replenishment", U.S. Appl. No. 15/806,436, filed Nov. 8, 2017.

(Continued)

*Primary Examiner* — Allen C Chein
*Assistant Examiner* — Denisse Y Ortiz Roman
(74) *Attorney, Agent, or Firm* — Daniel M. Yeates

(57) ABSTRACT

Automated item replenishment for a plurality of items is accomplished by associating each item with one or more tags, which may in turn be associated with a particular consumption level of the item. One or more tag detection units are positioned to monitor an entry and/or an exit point of a monitored location. An inventory database maintains an inventory of the items currently present at the location and tracks consumption levels and exhaustion dates associated with each item.

12 Claims, 10 Drawing Sheets

(56) References Cited

U.S. PATENT DOCUMENTS

| | | |
|---|---|---|
| 2014/0006131 A1 | 1/2014 | Causey et al. |
| 2014/0156423 A1 | 6/2014 | Argue |
| 2015/0186836 A1 | 7/2015 | Chouhan et al. |
| 2016/0055451 A1 | 2/2016 | Waters et al. |
| 2016/0371630 A1 | 12/2016 | Jetcheva et al. |
| 2017/0076249 A1 | 3/2017 | Byron et al. |
| 2017/0220995 A1* | 8/2017 | Paulweber ........... G06Q 10/087 |
| 2017/0314981 A1* | 11/2017 | Flockenhaus ........... G01F 23/20 |
| 2018/0285809 A1 | 10/2018 | Fredrich et al. |
| 2018/0315111 A1* | 11/2018 | Alvo .................... G06Q 10/087 |
| 2018/0336623 A1 | 11/2018 | Laye et al. |

OTHER PUBLICATIONS

List of IBM Patents or Patent Applications Treated as Related, dated Nov. 3, 2017, 2 pages.

Mell et al., "The NIST Definition of Cloud Computing", Recommendations of the National Institute of Standards and Technology, Special Publication 800-145, U.S. Department of Commerce, Sep. 2011, 7 pages.

* cited by examiner

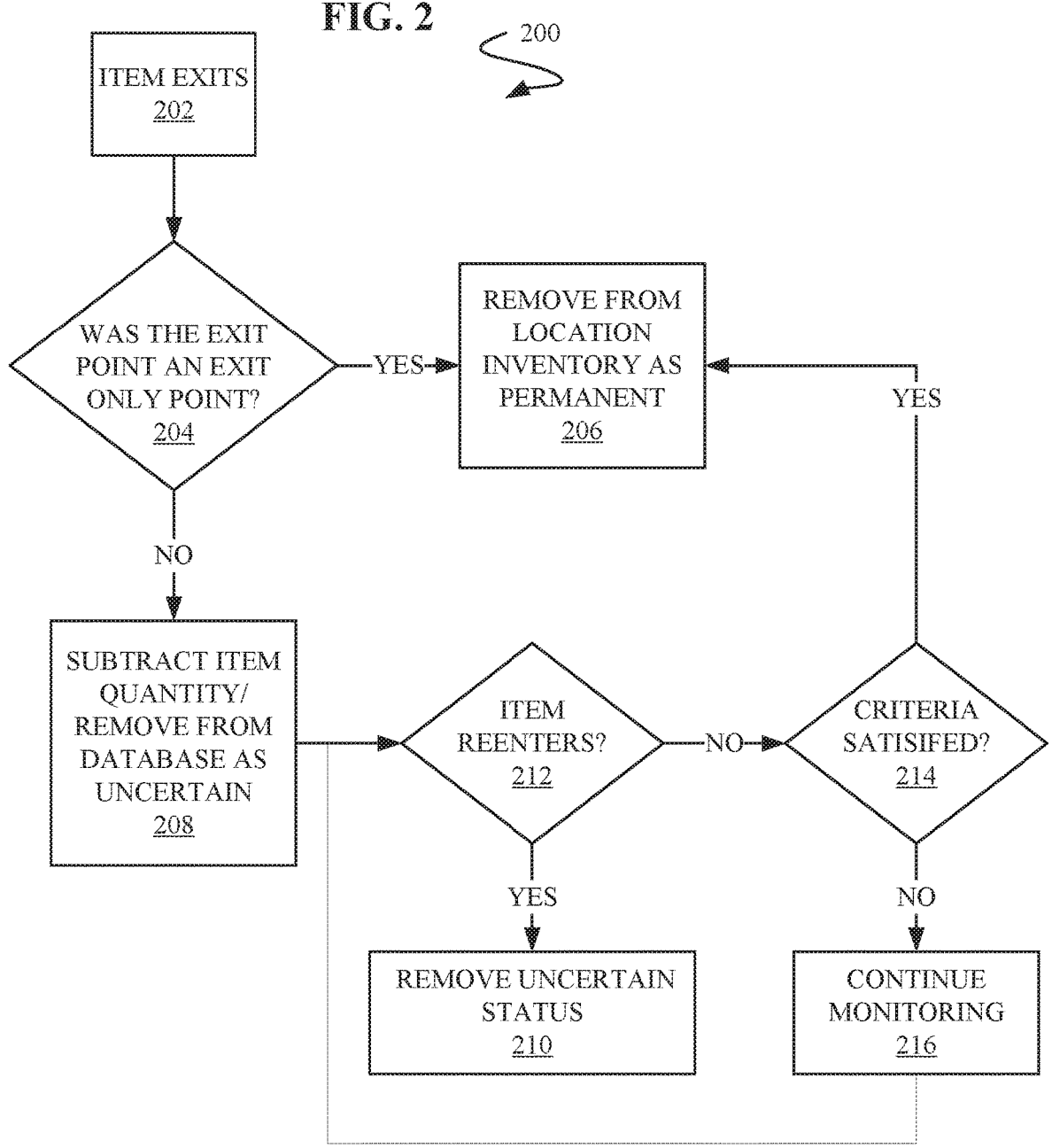

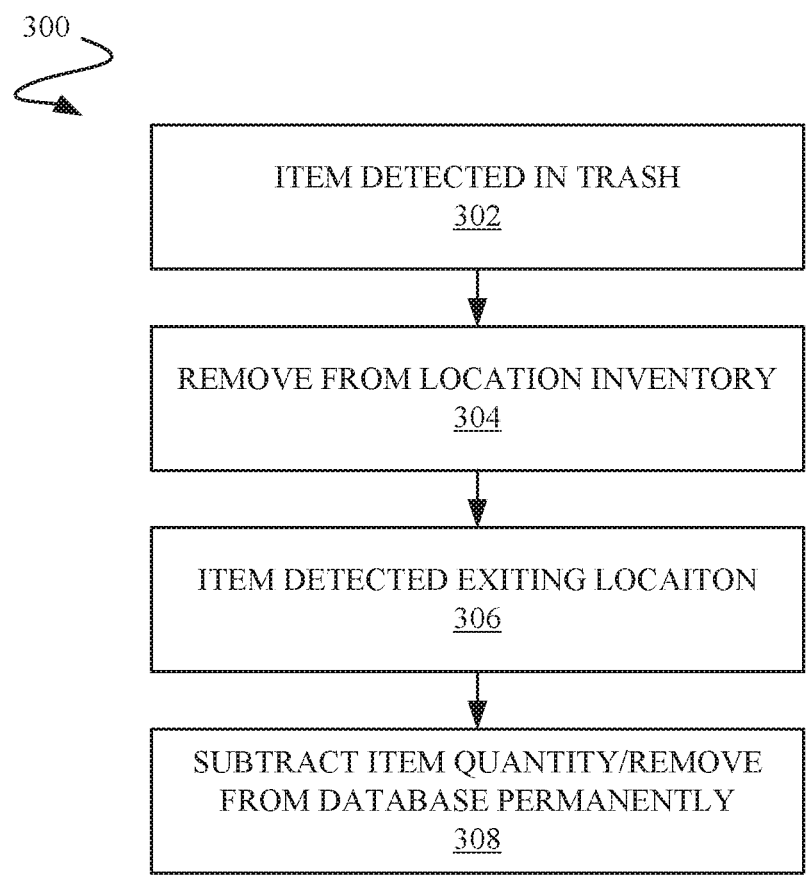

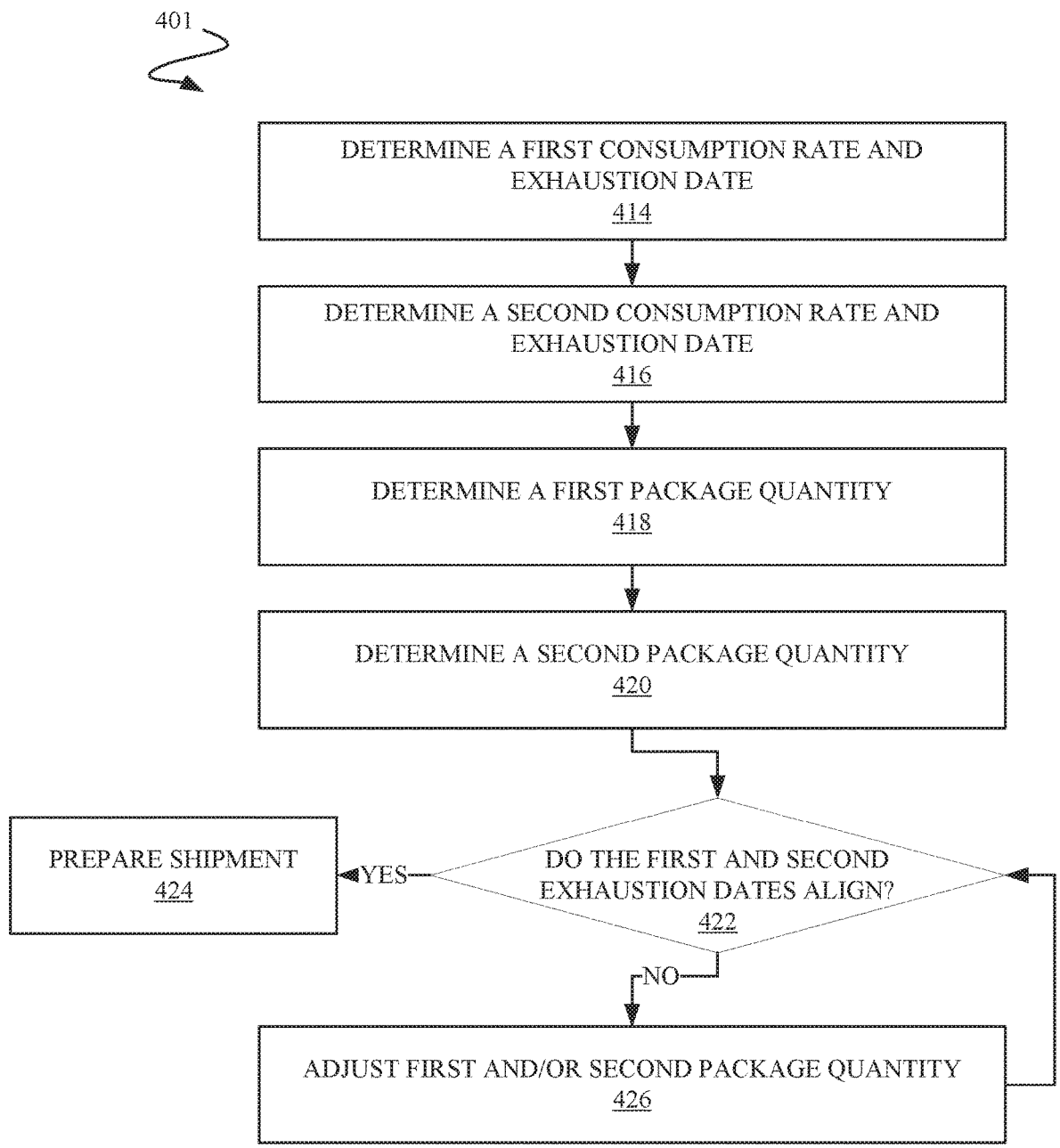

AUTOMATED INVENTORY REPLENISHMENT

BACKGROUND

The present disclosure relates to item replenishment, and more specifically, to supporting automated replenishment.

Many homes accomplish their necessary item replenishment through manual tracking and acquisition. As it becomes increasingly common for all members of the modern household to be occupied outside of the home, maintaining the home inventory may become lost in the shuffle. Household members may find themselves in the position of constantly being forced to make a trip to the store to replenish a few necessary items, or even a single critical item, that has completely run out.

SUMMARY

According to embodiments of the present disclosure, a system for item replenishment is described herein. In embodiments, the system comprises a plurality of items. Each item is associated with one or more tags, which may in turn be associated with a particular consumption level of the item. The system further comprises one or more tag detection units. Each tag detection unit may be positioned to monitor an entry and/or an exit point of a monitored location. The system further comprises an inventory database maintaining an inventory of the items currently present at the location and tracking consumption levels and exhaustion dates associated with each item.

Further described herein is a method for item replenishment. The method proceeds by receiving a first indication that an item has arrived at a monitored location. In response to receiving the first indication, the item is added to an inventory database. The item may have an associated exhaustion date stored in the inventory database.

A second indication is received indicating that a first consumption level of the item has been exhausted. In response to receiving the second indication, the exhaustion date in the inventory database is updated. A third indication that a second consumption level of the item has been exhausted is received and in response the exhaustion date in the inventory database is further updated.

In response to the exhaustion date reaching a predetermined threshold, an offer for the item is prepared and displayed at the location.

Further described herein is a computer-implemented system for modifying item packaging. The system comprises a memory containing an inventory database for a user and/or a location. The system further comprises a processor in communication with the memory, wherein the computer system is configured to perform a method.

The method proceeds by receiving an order from the user for an item. The system calculates an exhaustion time, a shipment time, and an initial replenishment time for the item according to the inventory database for the user. The system further calculates a package quantity according to the exhaustion time, shipment time, initial replenishment time, and inventory database.

A computing system and computer program product can embody the method and structures of the disclosure. The computing system can comprise a network, a memory configured to store inventory data, and a processor in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 is a flowchart of an example process tracking item exhaustion, according to embodiments of the present disclosure.

FIG. 3 is a flowchart of an example process for updating an item inventory following the item being placed in the trash, according to embodiments of the present disclosure.

FIG. 4B is a flowchart of an example method of aligning replenishment for multiple items, according to embodiments of the present disclosure.

Figure 1A:
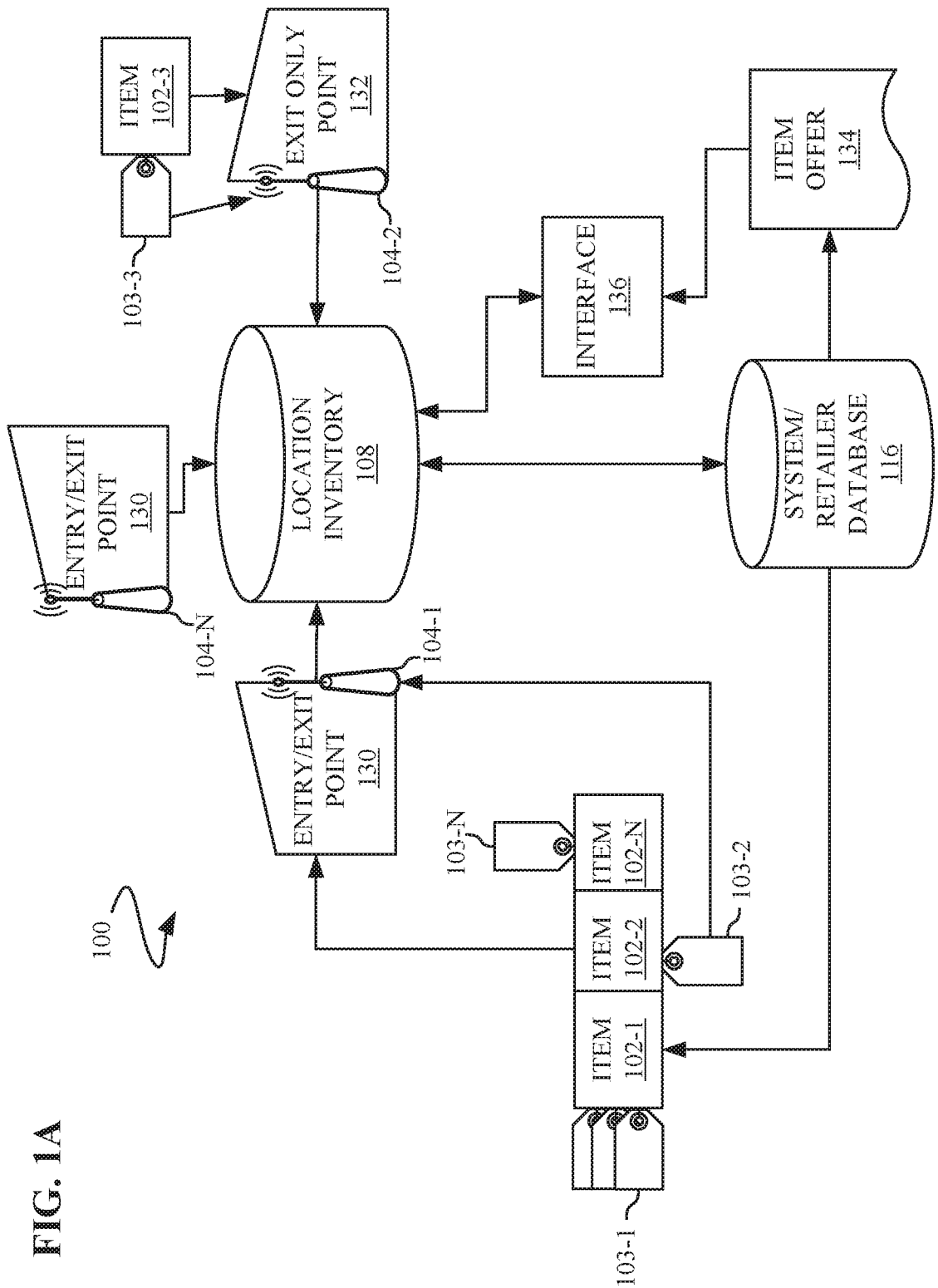
FIG. 1A is a diagram of an example system for automated item replenishment, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to item replenishment; more particular aspects relate to tracking item exhaustion to support automated replenishment. While the present disclosure is not necessarily limited to such applications, various aspects of the disclosure may be appreciated through a discussion of various examples using this context.

Traditional home item replenishment has relied on a user manually keeping a list of items as they are running out. Some systems have emerged which use technology such as an RFID reader to track inventory in, for example, a refrigerator, but no existing solutions extend to all household items in general. Further, existing inventory tracking and ordering systems do not effectively incorporate predictive replenishment, as existing systems either provide no predictive feature or rely upon error-prone manual entries to determine timing.

Described herein is a method and system for tracking item consumption to determine a consumption pattern and support an accurate predictive item replenishment system. By providing for tracking item consumption on a granular level, the system's predictive accuracy is greater than a system based on only an item's order history.

Referring now to FIG. 1A, the figure is a diagram of an example system 100 for automated item replenishment, according to embodiments of the present disclosure. The system 100 involves a plurality of items, such as items 102-1, 102-2, 102-3, 102-N (collectively items 102), each with at least one associated tag, such as tags 103-1, 103-2, 103-3, 103-N (collectively tags 103). Items 102 may include any number of retail items, such as household items like perishables (fresh and packaged foods), household cleaning products, toiletries, lawn maintenance products, automotive maintenance products, etc. In some embodiments, the associated tag is an RFID tag. However, in some embodiments, the associated tag can be any other means of uniquely identifying items (e.g., a bar code or an image identification system). In some embodiments multiple different means for identifying items can be employed on the same item (e.g. RFID tag and a bar code).

In embodiments, multiple tags can be associated with one retail item. For example, an item, e.g. item 102-1, may have more than one associated tag, e.g. tags 103-1. Each of the associated tags 103-1 may be associated with a distinct sub-package of item 102-1. In this way, the single retail item 102-1, which a consumer may purchase in a single transaction, may be tracked at three consumption levels to better assess when the item should be replenished. A tag may be associated with a particular consumption level of an item. For instance, an item, such as a container of liquid, for example a beverage or a cleaning product, may have three tags associated with it. Each tag, individually, may be associated with one third of the volume of the container. The multiple tags may be additive. For example, when a first tag, e.g. one of tags 103-1, is identified by the system as being discarded, the system may record that a first sub-package or first consumption level of an item has been exhausted. Then, when a second tag, e.g. another of tags 103-1, is identified by the system as being discarded, the system may record that a second sub-package or second consumption level of the item has been exhausted. If the item has a total of two sub-packages or two consumption levels, the system may then determine that the item has been fully exhausted and record a permanent exit date for the item.

In embodiments, the multiple tags associated with the single retail item may comprise a modifiable tag composed of multiple sub-tags. For example, an item may be tagged with a tag having three detachable portions. As the item is consumed, the consumer may detach and discard the portions to reflect the consumption level of the item. Each of the detachable sub portions of the tag may indicate a particular consumption level of the item. For instance, if, as in the example above, a container of liquid is associated with three, detachable, tags. As each tag is detached, discarded, and removed from the location, the system may process that an associated consumption level, e.g. one third, of the container has been exhausted.

The system 100 includes one or more tag detection units, such as units 104-1, 104-2, 104-N (collectively units 104), each tag detection unit 104 being positioned to monitor an entry/exit point 130 or an exit only point 132 of a location.

A location may also have an entry only point. When an item 102 (e.g. item 102-2) is delivered or otherwise brought into the location via an entry/exit point 130, the tag detection unit 104 (e.g. tag detection unit 104-1) detects that the item 102 is now present at the location. The detection can occur due to one or more tags 103 (e.g. tag 103-2) being detected by a tag detection unit 104 at the locations entry/exit points 130. Likewise, when an item 102 (e.g. item 102-3) passes through an exit only point 132, a tag detection unit 104 (e.g. tag detection unit 104-2) detects the item 102 by detecting the attached tag 103 (e.g. tag 103-3). The one or more tags may comprise a modifiable RFID tag (e.g. a tag with multiple detachable sub-portions).

In embodiments, the item identification mechanism, such as RFID, can be created such that other retailers cannot acquire inventory and consumption information easily. For example, a retailer can use a unique identifier for items shipping to a specific consumer, such that the identifier is unique to both the item and the consumer. A retailer database may be used to map the consumer and identifier to the item and quantity of the item. This identifier may be in any format such as numeric or binary value. It may be unique within the products shipped under a particular User ID (who ordered the product) or a household address, but the same identifier can be used for product shipped to a different household.

In response to detecting that the item 102 is at the location, the tag detection 104 unit adds the item 102 at the quantity detected to a location inventory 108. In embodiments, the location inventory 108 is a local database. In other embodiments, it can be a remote database, such as a database hosted on a cloud or other distributed platform. The location inventory 108 can be an independent memory device or located in a larger computing system.

The location inventory 108 maintains a rolling inventory of the items currently present at the location. Each item in the inventory may have an associated exhaustion date, or a date the location is projected to run out of the item. An item may be populated onto a list of items recommended for replenishment according to the nearness of their associated exhaustion dates.

In embodiments, a predetermined threshold is used to determine when an item's exhaustion date is near enough that the item should be placed onto the list of items recommended for replenishment. The predetermined threshold may be determined according to a replenishment time associated with each item. The replenishment time may be determined according to a calculation of the time predicted to elapse between the user placing an order for the item and the item arriving at the location. Replenishment time may generally consider the time necessary for order processing and shipping. For example, if a retailer requires two days to allocate and package inventory for the user and a shipping service requires two days to transport the item from the retailer to the user then, in this example, replenishment time for the item is four days. Additionally, in order to ensure that the item is delivered on time, the system may adjust this calculated replenishment time. For example, the system may periodically receive updates regarding shipping conditions. During the holiday season, shipping times may be substantially longer than typical, perhaps taking four days for delivery instead of two days, in this example. The replenishment time may accordingly be extended to six days under such conditions.

A system/retailer database 116, may contain global data relevant to the item, additional to the information obtained from the location inventory 108. The system/retailer database 116 may contain, for example, an order history associated with the user or the location, more general information related to the item or items, ordering and usage information associated with similar or related users and/or locations, etc.

The system/retailer database 116 may participate in preparing item offers 134, to submit to the location. An item offer 134 may be used to incentivize a user to select a particular retailer, to purchase items in greater quantity, to arrange for automated replenishment, to purchase related items, etc.

In embodiments, the system 100 includes an interactive interface 136. The interface 136 may serve to receive and display item offer 134 and to permit manual adjustments to the location inventory 108. The interactive interface 136 may be a dedicated console or a program or application run on a separate device.

In embodiments, the disclosure herein further comprises a method for item replenishment. Executed at the location of the consumer, the method may involve receiving an indication that an item has arrived at the location (i.e., the location of the customer). Once the item's arrival at the location is confirmed, the item is added to an inventory database. In the inventory database the item may have associated data such as an exhaustion date.

Figure 1B:
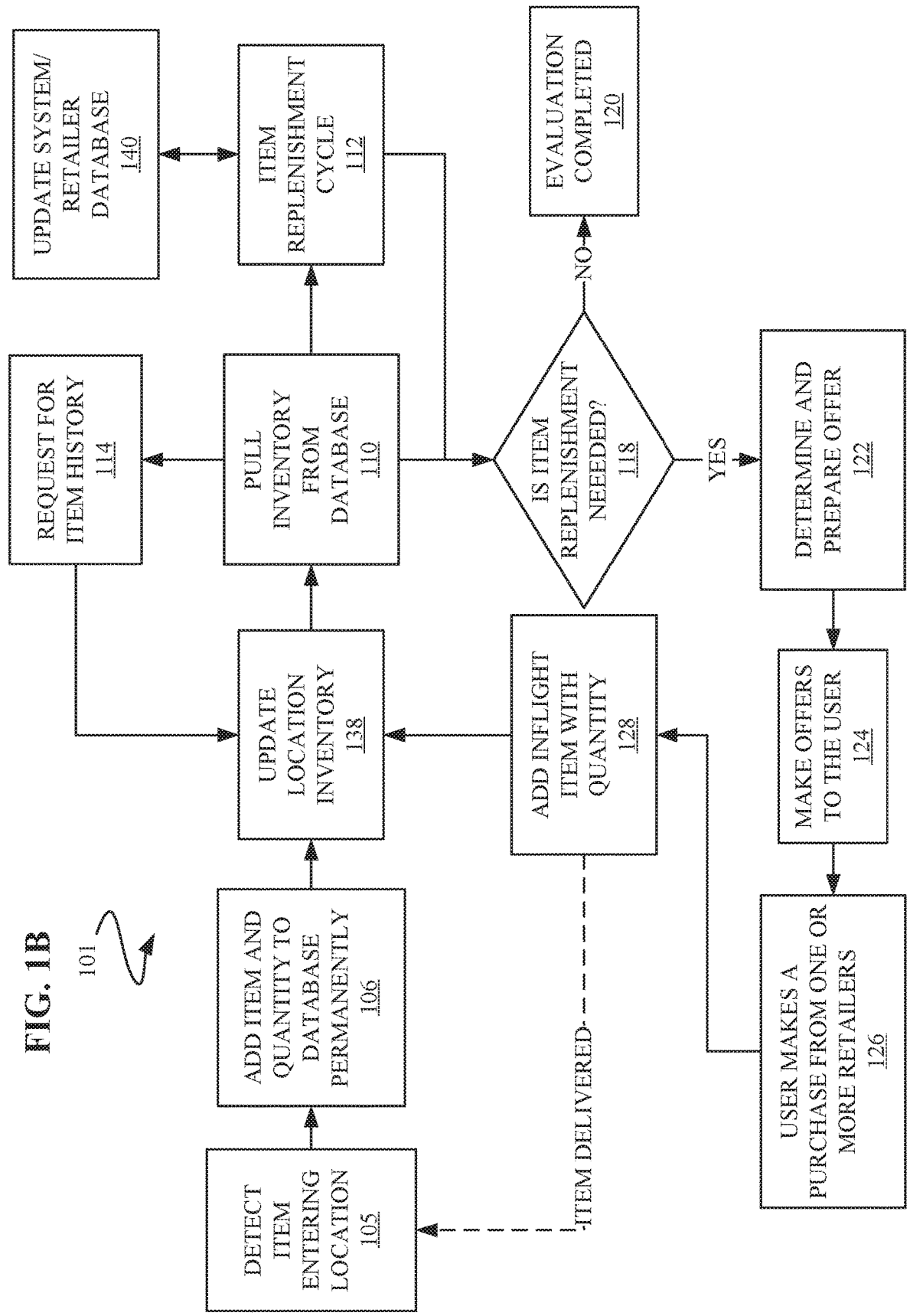
FIG. 1B is a flowchart of an example process for item replenishment, according to embodiments of the present disclosure.

Referring now to FIG. 1B, the figure is a flowchart of a process 101 for automated item replenishment, according to embodiments of the present disclosure. The process 101 may be carried out by a system such as system 100 of FIG. 1A.

When a tag detection unit (such as tag detection unit 104 of FIG. 1A) detects an item (such as item 102 of FIG. 1A0 entering the location, at step 105, the item and quantity is added to the database with a "Permanent" status, at step 106. The location inventory (such as location inventory 108 of FIG. 1A) is updated accordingly, at step 138.

When an item's consumption level or exhaustion date reaches a predetermined threshold, the system may pull inventory from the database, as in step 110, to initiate a replenishment cycle, as in step 112.

In embodiments, when the system pulls the location inventory data, at step 110, it may note deficiencies in the data. For example, an item with an "Uncertain" status, or an item that has been at the same partially consumed status for an extended period of time, e.g. a bottle of shampoo may have had the first half of the bottle consumed in four weeks, but the remaining half is still logged in the system as unconsumed five weeks later. The system may submit a request for a user to provide any missing data or correct any erroneous data by submitting a request for an updated item history, as in step 114. The request for item history may be submitted via an interactive interface (such as interactive interface 136 of FIG. 1A). The interface may permit manual updates to the inventory of the items. The interface may also serve to provide a display of items recommended for replenishment. The systems response may include a reminder to the consumer that the item requires replenishment and/or it may include an offer from a particular retailer for the item nearing exhaustion. In embodiments, the offer may be displayed on a monitor at the location. In embodiments, the request for item history may be submitted by any other means the system may use to communicate, e.g. email, text message, prompt window, push notification, etc. The location inventory is updated according the submitted item history at step 138.

In embodiments, the replenishment cycle communicates with a system or retailer database, at step 140. The system database (such as system/retailer database 116 in FIG. 1A) may contain more global data relevant to the item than the location inventory. The system/retailer database may contain, for example, an order history associated with the user or the location, more general information related to the item or items, ordering and usage information associated with similar or related users and/or locations, etc.

According to the information obtained from the location inventory at step 110, the manual entries requested at step 114, and the system database at step 140, the system may determine whether the item requires replenishment, at decision block 118. If the system determines that replenishment is not required at the current time, the evaluation may be completed, as in operation 120.

If the system determines that replenishment is required, then one or more retailers may determine and prepare an offer (or combinatorial offer) to make to the user, as in step 122. In embodiments, the offer may include price reductions, associated items, or other incentives to encourage the user to select a particular retailer. For example, a retailer, upon receiving an indication that an item is due to be replenished for a user, may decide to offer the user a discount on a greater quantity or automated replenishment.

Once prepared, offers may be distributed to the user and/or the locations, as in step 124. Offer distribution may be via an interactive interface integrated or in communication with the system, or by any other means of communication utilized by the user and/or the location (e.g. email, paper mailer, etc.)

At any point, a user or location may access the system to place an order for an item and make a purchase from the one or more retailers, as in operation 126. In embodiments, the order may be placed through the system itself (e.g. through the interactive interface) or through any other means the user has for communicating with the retailer (e.g. through a retailer's website or app, email, etc.). In embodiments, operations 122, 124, and 126 may be executed on a vendor platform.

When an item is ordered, the system updates the location inventory, at step 138, to indicate that the item is inflight, at step 128. Once the item is delivered, it triggers an update to the location inventory when the item is detected entering the location, at step 104.

FIG. 2 is a diagram of an example process 200 for tracking and updating a location inventory (described with respect to FIG. 1A above) when an item departs the location.

At step 202, an item (such as item 102 of FIG. 1A) is detected departing the location. This detection can be performed by a tag reader (such as tag reader 104 of FIG. 1A) at an exit point(s) (such as entry/exit point 130 or exit only point 132 of FIG. 1A) of the location receiving an indication via a tag (such as tag 103 of FIG. 1A) on the item or the item's packaging. The exit only points of the location may include trash receptacles, recycling bins, compost bins, donation bins, garbage chutes, etc. If the item is detected as departing the location via an exit only point, e.g. a trash receptacle, as assessed at decision block 204, the system responds by removing the item, or adjusting the item's consumption level, permanently in the location inventory (such as location inventory 108 of FIG. 1A), at step 206. For example, if an item, e.g. a bottle of shampoo, is detected exiting the location, the system can assess whether the exit point was an exit only point. If it determines that the exit point was a trash receptacle, the bottle of shampoo is permanently removed from the location inventory.

If at decision block 204 the item is not detected departing the location via an exit only point, the system may respond by removing the item or item quantity from the location inventory with an "Uncertain" status, as in step 208.

At decision block 212, the system determines whether an item with an "Uncertain" status has been detected reentering the location. If the item is detected returning to the location, the item or the portion of the item may be reinstated to the location inventory and the "Uncertain" status removed, as in step 210.

For example, if a user were to take a bottle of shampoo from their home on a trip with them, the system would detect the bottle of shampoo leaving the house. The system would assess and determine that the point of exit was not an exit only point and would therefore remove the item from the location inventory with an "Uncertain" status. The "Uncertain" status indicates to the system that it should continue to monitor for the item's return.

As another example, 10 bags of chips may be removed from the user's house for a picnic at 9:00 AM on a particular day. This can be detected by sensors located at the front door, back door, garage door, or another entry/exit point of the house. At 6:00 PM, 5 bags of chips may be brought back to the house. In this example, the 10 bags of chips would be marked with an "Uncertain" status at 9:00 AM. At 6:00 PM, the uncertain status will be removed for all 10 bags of chips, 5 will be marked as permanently exhausted, and 5 will be marked as available at the location.

While the item remains in an "Uncertain" status, criteria may be continually or periodically referenced to assess whether the item should remain in an "Uncertain" status and receive continued monitoring (as in step 216), be reinstated to the inventory (as in step 210), or be removed permanently (as in step 206). For example, a possible criterion of "time elapsed" may be used to assess an item's uncertain status. Assessed at decision block 214, the system determines whether the criterion has been satisfied. In this example, the criterion may be whether or not 24 hours have elapsed since the item was placed in an "Uncertain" status. In embodiments, criteria, such as the 24 hours elapsed in this example, may be a system default, or established by the user. If the criteria are met, if the item has been "Uncertain" for 24 hours or more, the system permanently removes the item or item portion from the location inventory, as at step 206. If the criteria are not met, e.g. if the item has been "Uncertain" for less than 24 hours, the system maintains the "Uncertain" status and continue to monitor for the item's return, as in step 216.

The criteria may vary for each category of item, each brand of item, time of day etc. And, it can be determined dynamically, based on the historical consumption pattern of the user. For example, a user may typically bring sunscreen out of a house at 9:00 AM on Saturday, and the user may then bring the sunscreen back at 6:00 PM on the subsequent Sunday. The same user may typically bring the sunscreen out of a house at 8:00 AM on a weekday, and bring the sunscreen back at 5:00 PM on the same weekday. A first criterion may be dynamically created for the weekend, where sunscreen will return on Sunday. A second criterion can be dynamically created for a weekday, where sunscreen will return on the same day.

In embodiments, other categorizations of entry and exit points can be used to track items and influence the inventory differently. In the examples above, indication from a trash receptacle can be used to confirm that an item has been consumed by a user, while a non-trash receptacle may indicate that the item might return. In a further example, exiting the house via a patio door to the grill area may be determined to indicate that the item is likely to stay within the premise and return to the house. The inventory system may consider a 24 pack of bottled water distributed through the house as available, and each bottle may only be removed from the inventory system if the system receives indication that a bottle has entered a trash receptacle (e.g. a recycle bin).

In embodiments, specific categorization of items may influence the inventory differently. In an example, a reusable water bottle may exit through the front door the system may expect that the water bottle will return. If the user didn't return with the water bottle that may indicate the user has lost it and therefore the item should be permanently removed from the inventory.

In embodiments, tracking at the entry and exit point may work in conjunction with other tracking mechanisms, such as item tracking in a smart refrigerator or a cabinet that has sensor for tracking. Tracking items at entry and exit points can reduce the number of sensor and tracking devices required throughout a house. Integration with other tracking mechanisms may allow the system to further determine the consumption patterns and exhaustion times associated with item at the location. For example, a gallon of milk may go out and back into the refrigerator 25 times, and then into the trash. In this example, it can be estimated that when the milk is removed from the refrigerator 13 times, the milk may be approximately half consumed. This data may be processes and averaged over time to develop a more reliable estimation of the expected consumption rate of an item.

Referring now to FIG. 3, depicted is an example process 300 for updating a location inventory (e.g., location inventory 108 as described in FIG. 1A) when an item is discarded, e.g. exits the location via an exit-only point. When an item or a sub-portion of an item is discarded, it may be detected by a tag sensor in the exit only point, as in step 302. The tag sensor on the exit only point detects a tag associated with the item or the item's packaging. If an item has multiple associated tags, the tag sensor can detect when one portion, or a certain consumption level, of an item is discarded.

When the item is detected passing the exit only point, the system responds by removing the item, or the item quantity from the location inventory, as in step 304. In embodiments, the item is permanently removed from the location inventory at operation 304.

This detection of trash removed from the location can further be detected based on multiple items within the trash, as these multiple items are removed from a location at the same time. This allows differentiating trash removed from a location (directly affecting inventory) and one or more items removed from a location (items will be marked with As the item is used up by the consumer, sub-packing or detachable tags are discarded corresponding to the consumption level of the item. As the tags are discarded, an indication that a first consumption level of the item has been exhausted may be received. Once the indication that the first consumption level has been exhausted has been received, the inventory database may be updated so that the exhaustion date is responsive to changes in the rate of consumption of the item.

As the item is used up by the consumer, sub-packing or detachable tags are discarded corresponding to the consumption level of the item. As the tags are discarded, an indication that a first consumption level of the item has been exhausted may be received. Once the indication that the first consumption level has been exhausted has been received, the inventory database may be updated so that the exhaustion date is responsive to changes in the rate of consumption of the item.

As the consumer continues to use the item, another portion of sub-packaging or another detachable tag may be discarded. This discarding of the tags may trigger another indication to be received, indicating that a second consumption level of the item has been exhausted. The exhaustion date in the inventory database may be updated accordingly, in response to receiving the new indication.

As the consumption levels of the item are exhausted, the exhaustion date is updated to a date nearer to the current date, as the remaining amount of the item is reduced in the inventory. In embodiments, the exhaustion date may pass a predetermined threshold, e.g. five business days between the current date and the exhaustion date, and the system may respond by issuing a reminder to the user to replace the item, submitting an offer for the item from a retailer, automatically issues a reorder, etc.

In embodiments, the predetermined threshold may be determined according to a replenishment time for the item. The replenishment time, in turn, may be determined according to a projected preparation time and a projected shipping time for the item. An item's projected preparation time may be variable according to the retailer's supply sources and shipping time may be variable according to the time of year. For example, shipping time may be subject to factors such as weather and shipping load, and consumer preferences, including, for example, a consumer's willingness to pay a higher price for an item to be express shipped or to pick up an item from a central delivery location. In embodiments, a consumer may participate in a free shipping program provided by the retailer.

In embodiments, the system (e.g. the system 100 of FIG. 1A) may implement a secondary confirmation of the item's exhaustion by detecting when the item, as part of the garbage, is removed from the location, at step 306. The item may then be permanently removed from the location inventory (e.g. location inventory 108 of FIG. 1A), at step 308. This detection of trash removed from the location can further be detected based on multiple items within the trash, as these multiple items are removed from a location at the same time. This allows differentiating trash removed from a location (directly affecting inventory) and one or more items removed from a location (items will be marked with Uncertain" status).

Figure 4A:
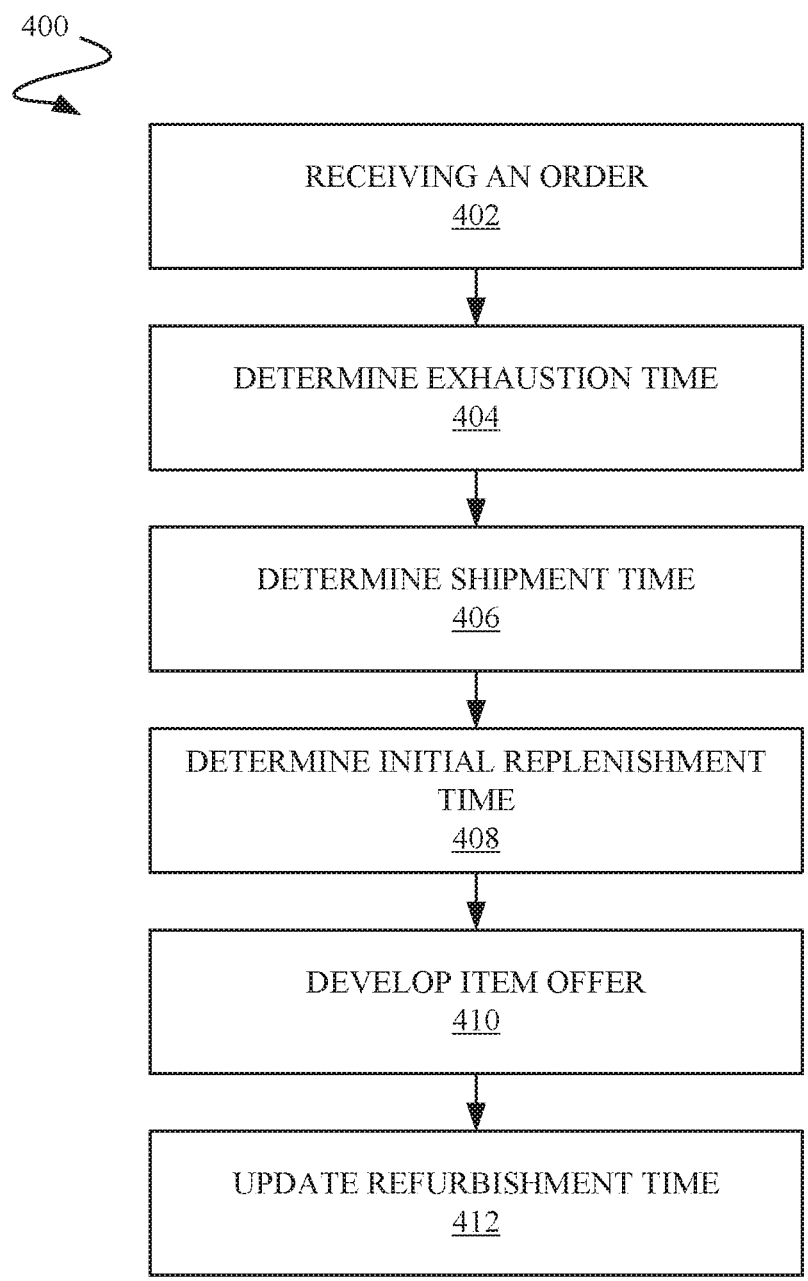
FIG. 4A is a flowchart of an example method of item replenishment, according to embodiments of the present disclosure.

Referring now to FIG. 4A, the figure is example flowchart of a method 400 for automated item replenishment, according to embodiments of the present disclosure. In embodiments, the method may involve receiving an order from the user for an item, at step 402. The user may have issued the order in response to receiving a replenishment list or an item offer.

The exhaustion time, determined at step 404, may be the average time a particular user or location takes to deplete a particular quantity of the item. The exhaustion time of a particular item may be measured by tracking a tag on the item from arrival at the location until the item is fully consumed. The tag may be tracked by a tag reader, for example, an RFID reader, monitoring entrances, exits, and/or disposal bins at the location.

The shipment time, determined as in operation 406, may generally be the expected time to deliver the item to the location from the supply facility. The initial replenishment time, determined as in operation 408, may generally be the time required to modify the packaging to suit the needs of the user and/or location. In embodiments, steps may be performed in any order or combination, or in parallel.

At operation 410, the system develops an item offer. Developing the item offer may include determining how to present the offer to the user, markdowns, or other incentives to encourage the user to select a particular retailer, item and item packaging customization, etc.

As an example of item or item packaging customization, the system may determine a package quantity according to the exhaustion time, shipment time, initial replenishment time, and other information from the inventory database. In embodiments, the package quantity may serve as part of the item offer. Other information from the inventory database may include quantity information, and/or data concerning seasonal or other timely changes in item consumption patterns. In embodiments, the package quantity may be initially determined by the system prior to calculating the initial replenishment time and used when calculating the initial replenishment time.

For example, the system may determine that a carton of 12 eggs was consumed by the user in 6 days (as in operation 404). It's known that egg replenishment takes 3 days (as in operation 408). The retailer can ship the eggs in two cartons with 6 eggs each carton (as in operation 406). This allows the accurate detection of eggs consumption after the first carton is disposed, and provides enough time for replenishment. Furthermore, the retailer can offer an auto-ship program with dynamic criteria such as "ship instantly after the first carton of eggs is disposed" (as in operation 410). In this example, it is desirable to ship eggs in two cartons of 6 eggs and 3 days after the disposal but the packaging might not be available or it might not be cost effective, so another option may be used. The retailer could determine through projection or extrapolation that the user consumes 18 eggs in 9 days. The retailer can offer the user two cartons with 9 eggs each carton (as in operation 410), and adjust the shipment time to 1-2 days after the first egg carton is disposed (as in operation 412).

Furthermore, similar techniques can be used to align multiple item shipments. For example, breakfast items, such as milk, cheese, eggs and orange juice, can be replenished together by aligning the exhaustion time and shipment time. A user may consume 12 eggs in 6 day, and with replenishment initiated 3 days before the predicted exhaustion date, so the user will not run out of eggs. This user may also consume 16 oz of ham every 9 days. It may be known that ham replenishment take 3 days, and ham expires within 10 days. Thus, replenishment should be initiated 3 days before exhaustion to ensure ham will not run out. There are multiple packaging options to satisfy all of the replenishment, exhaustion, and expiration requirements. For example, a first packaging option for this user would be to provide 18 eggs, shipped in 2 cartons with 9 eggs in each carton and 2 packages of ham with 8 oz in each package. With this packaging option, if the user begins consuming the eggs and ham at their usual rate on day 1, it would be expected that around day 4 or 5 the user will dispose of one egg package and one ham package. Further, if it is detected that the ham and egg package are actually disposed of before the sixth day, then an order can be placed for the next package eggs and ham to be delivered before they are exhausted. Since this user typically orders 12 eggs at a time, an additional incentive could be offered so that the 18 eggs will be ordered and shipped with the ham.

In embodiments, the consumer may be offered an incentive when ordering in bulk. For example, if the eggs' expiration date is 35 days from receiving the eggs, then the consumer may be offered an order of 60 eggs (which according to this consumer's usual consumption rate would be fully exhausted within 30 days, before their expiration date). In this example, if shipping the ham and eggs together is more optimal than selling 60 eggs and ham separately, then, an offer for 18 eggs and ham will be more appropriate for the user. Further, the user may optionally select to keep an inventory of less than 24 eggs. Similar logic and reasoning can apply to multiple items, resulting in some items being appropriate for bulk ordering and some item being more appropriate for ordering and shipping in smaller quantities or with other items. In embodiments, the method further comprises calculating an updated replenishment time, as in operation 412. The updated replenishment may be adjusted according to any new data regarding the total time.

The system may further comprise a processor in communication with the memory or otherwise able to access the database. The computer system may generally be configured to perform example processes 101, 200, 300, and 400 as depicted in FIGS. 1B-4.

Referring now to Table 1, below, the table is an example of a location inventory, according to embodiments of the present disclosure. The location inventory may track relevant data in any number of ways, but a table is used herein to provide a convenient visualization. The location inventory may track any number of relevant data fields, but some useful fields may include: a tag ID (a tag ID number in the example in Table 1), a sub ID, the items entry and exit dates, and the item's order and inventory status.

TABLE 1

| ROW NUM. | TAG ID | SUB ID | ENTRY DATE | DISPOSED | EXIT DATE | CONSUMPTION LEVEL | STATUS |
|---|---|---|---|---|---|---|---|
| 1 | 0001 | 1 | 5/6/2016 | 9/7/2016 | 9/8/2016 | 100% | PERMANENT EXIT |
| 2 | 0001 | 2 | 5/6/2016 | — | 8/7/2016 | 50% | UNCERTAIN |
| 3 | 0002 | 1 | 8/9/2016 | — | — | 0% | ON HAND |
| 4 | 0001 | 3 | — | — | — | 0% | INFLIGHT |

In embodiments, the tag ID, such as the tag ID number used herein, may be a unique identifier for the particular item tagged. The inventory may further track a sub ID for each tagged item entering, as multiples of an item may be brought into the location. In Table 1, rows 1 and 2 each refer to the same type of item (tag ID 0001) and since there are multiple of item 0001 at the location they are identified through their individual sub IDs as 1 and 2. The entry date indicates that both multiples of item 0001 were brought into the location on the same date (May 6, 2016) which may indicate that the particular location desires to have two multiples of item 0001 on hand. In embodiments, the inventory may have a longer history of data concerning item 0001, which may indicate whether or not having two multiples of the item at the location is a deviation from the location's normal pattern or not. In row 3, another type of item (item ID 0002) is depicted. As the item in row 3 is not a multiple of item 0002, its sub ID is 1.

Table 1 further indicates that the item in row 1 has been fully consume (100% consumption level) and, in embodiments, this may have triggered the item's status be set to PERMANENT EXIT. Row 1 further indicates that a replacement for the item in row 1 was disposed on Sep. 7, 2016, the day before the item in row one is determined to have exited the location, Sep. 8, 2016. The system may have automatically ordered a replacement due to the item reaching a predetermined threshold, such as for consumption level, or the replacement order may have been placed when the container for the item in row 1 was placed in a trash receptacle and the exit date set when the trash was taken out of the location. The DISPOSED date may, in embodiments, be set according to a manual order placed by a user at the location.

In embodiments, the system automatically updates the item to reflect expected incoming item, such as in row 4, where a third multiple of item 0001 is indicated to be INFLIGHT. This may be the item disposed on Sep. 7, 2016 when the first multiple if item 0001 (from Row 1) was depleted. The item of row 4 has not yet been received, and therefore has no entry date.

In row 2, the second multiples of item 0001 is shown to have an UNCERTAIN status. In embodiments, the UNCERTAIN status may be set in response to the item leaving the location without being fully consumed (50% consumption level) or due the item leaving the location without being first placed in a exit only point. There may be a predetermined threshold, such as "time elapsed," that has not yet been met since the item was removed from the location.

Further disclosed herein is a computer-implemented method to align replenishment for two or more products. Referring now to FIG. 4B, the figure is a flowchart of an example method 401 for aligned the replenishment of at least two products, according to embodiments of the present disclosure.

At step 414, a first consumption rate and a first exhaustion date for a first item are determined, as discussed above. At step 416 a second consumption rate and a second exhaustion date for a second item are determined. In embodiments, the consumption rates are determined according to data obtained from a location inventory (such as location inventory 108 of FIG. 1A). The location inventory may track the consumption rate via tags associated with each item. The tags may have multiple portions, or multiple tags may be associated with each item, facilitating the tracking of items' consumption levels. Tags, or tag portions, may be tracked additively, such that the tracked consumption levels accumulate until the item is fully consumed.

At step 418, a first package quantity for the first item is determined according to the first consumption rate. At step 420, a second package quantity for the second item is determined according to the second consumption rate. In embodiments, the items are packaged with further consideration given to their respective expiration dates, shipment times.

At decision block 422, a determination is made whether the first and second exhaustion date, correlated to the first and second package quantity, align. If the first and second item will exhaust concurrently, the shipment is prepared, at step 424. If the exhaustion dates do not align, then the package quantities can be adjusted, at step 426. The alignment of the exhaustion dates is then verified at decision block 422.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5A:
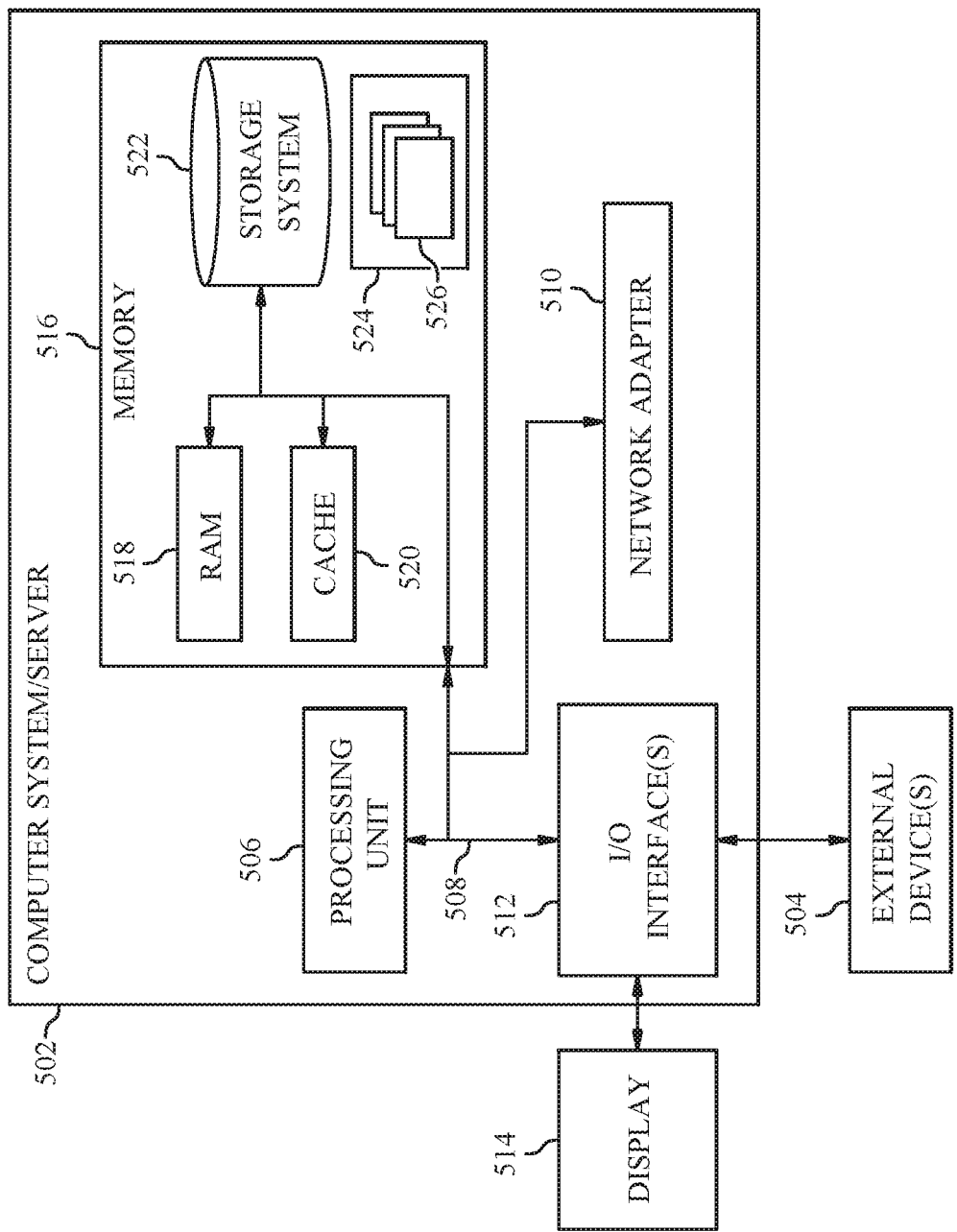
FIG. 5A is a block diagram of a computer system/server in cloud computing node in the form of a general-purpose computing device, according to embodiments of the present disclosure.

Referring now to FIG. 5A, a schematic of an example of a cloud computing node is shown. Cloud computing node 500 is only one example of a suitable cloud computing node and is not intended to suggest any limitation as to the scope of use or functionality of embodiments of the invention described herein. Regardless, cloud computing node 500 is capable of being implemented and/or performing any of the functionality set forth hereinabove.

In cloud computing node 500 there is a computer system/server 12, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5A, computer system/server 502 in cloud computing node 500 is shown in the form of a general-purpose computing device. The components of computer system/server 502 may include, but are not limited to, one or more processors or processing units 506, a system memory 516, and a bus 508 that couples various system components including system memory 516 to processor 506.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 12, and it includes both volatile and non-volatile media, removable and non-removable media.

System memory 516 can include computer system readable media in the form of volatile memory, such as random access memory (RAM) 518 and/or cache memory 520. Computer system/server 502 may further include other removable/non-removable, volatile/non-volatile computer system storage media. By way of example only, storage system 522 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 516 may include at least one program product having a set (e.g., at least one) of program modules that are configured to carry out the functions of embodiments of the invention.

Program/utility 524, having a set (at least one) of program modules 526, may be stored in memory 516 by way of example, and not limitation, as well as an operating system, one or more application programs, other program modules, and program data. Each of the operating system, one or more application programs, other program modules, and program data or some combination thereof, may include an implementation of a networking environment. Program modules 526 generally carry out the functions and/or methodologies of embodiments of the invention as described herein.

Computer system/server 502 may also communicate with one or more external devices 504 such as a keyboard, a pointing device, a display 514, etc.; one or more devices that enable a user to interact with computer system/server 12; and/or any devices (e.g., network card, modem, etc.) that enable computer system/server 502 to communicate with one or more other computing devices. Such communication can occur via input/output (I/O) interfaces 512. Still yet, computer system/server 502 can communicate with one or more networks such as a local area network (LAN), a general wide area network (WAN), and/or a public network (e.g., the Internet) via network adapter 510. As depicted, network adapter 510 communicates with the other components of computer system/server 502 via bus 508. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 5B:
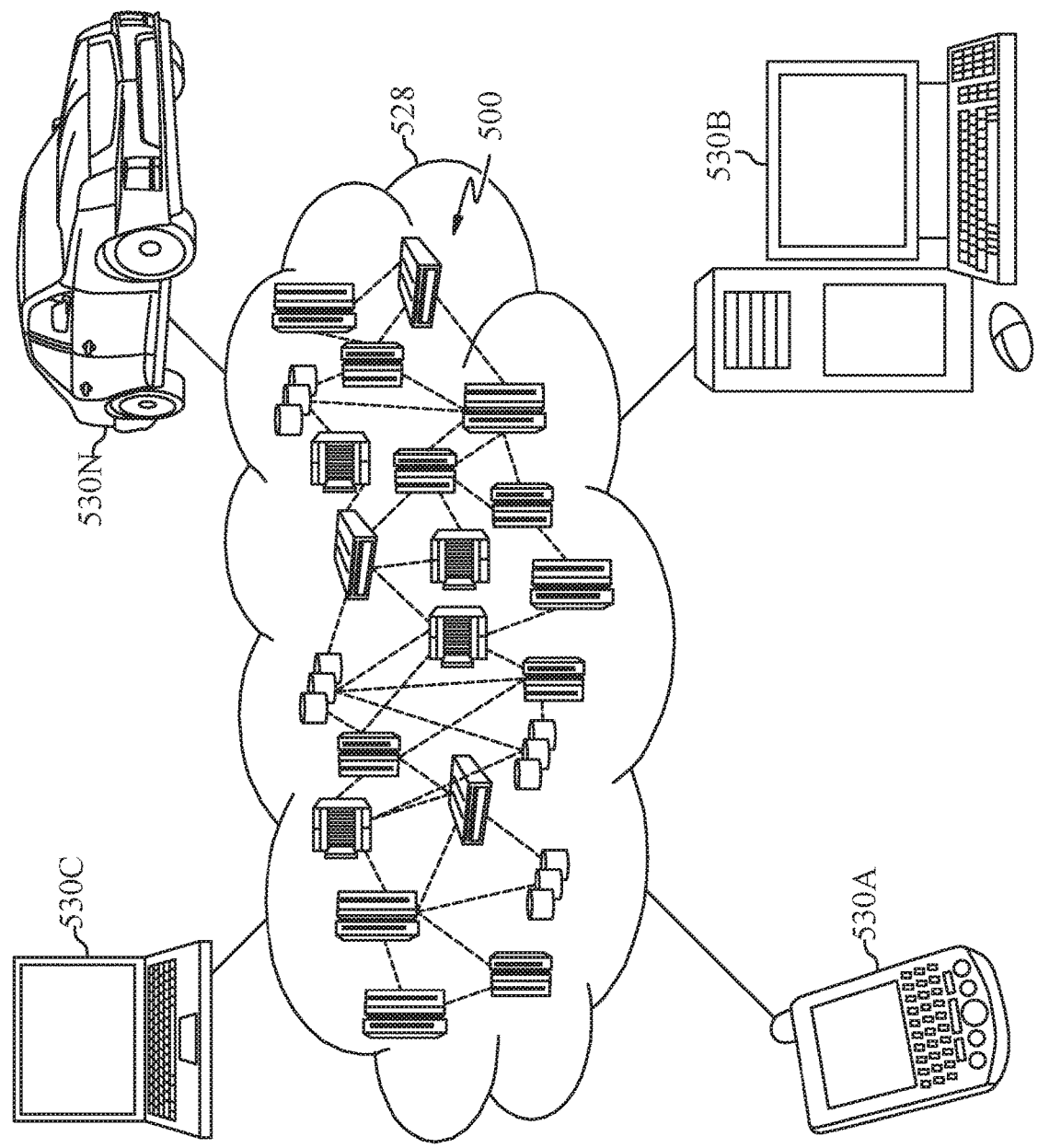
FIG. 5B is a block diagram of a cloud computing environment, according to embodiments of the present disclosure.

Referring now to FIG. 5B, illustrative cloud computing environment 528 is depicted. As shown, cloud computing environment 528 comprises one or more cloud computing nodes 500 with which local computing devices used by cloud consumers, such as, for example, personal digital assistant (PDA) or cellular telephone 530A, desktop computer 530B, laptop computer 530C, and/or automobile computer system 530N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 528 to offer infrastructure, platforms and/or software as services for which a cloud consumer does not need to maintain resources on a local computing device. It is understood that the types of computing devices 530A-N shown in FIG. 2 are intended to be illustrative only and that computing nodes 500 and cloud computing environment 528 can communicate with any type of computerized device over any type of network and/or network addressable connection (e.g., using a web browser).

Figure 5C:
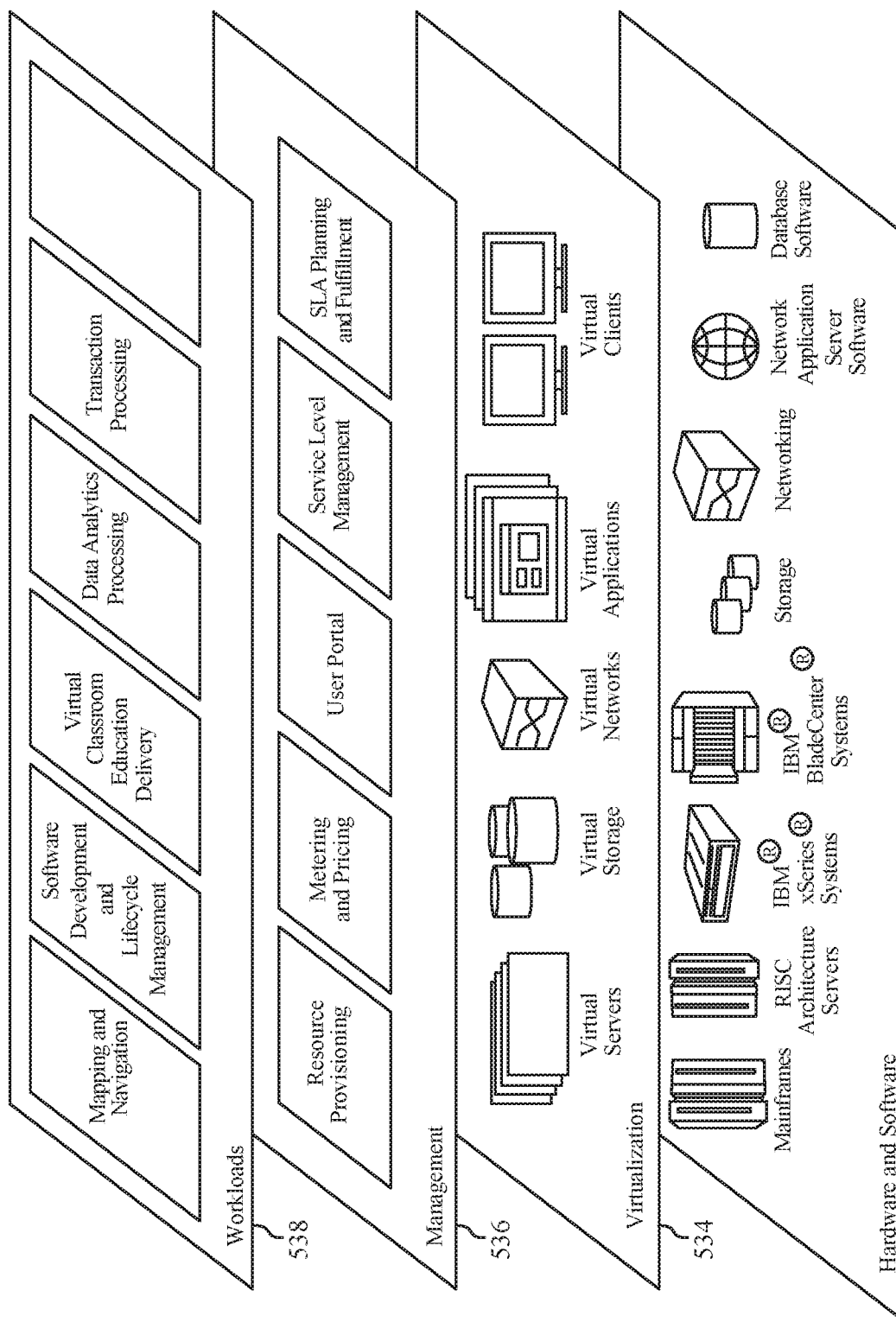
FIG. 5C is a block diagram of a set of functional abstraction layers provided by cloud computing environment, according to embodiments of the present disclosure.

Referring now to FIG. 5C, a set of functional abstraction layers provided by cloud computing environment 528 (FIG. 5B) is shown. It should be understood in advance that the components, layers, and functions shown in FIG. 5C are intended to be illustrative only and embodiments of the invention are not limited thereto. As depicted, the following layers and corresponding functions are provided:

Hardware and software layer 532 includes hardware and software components. Examples of hardware components include: mainframes 61; RISC (Reduced Instruction Set Computer) architecture based servers 534; servers 63; blade servers 536; storage devices; and networks and networking components 538. In some embodiments, software components include network application server software and database software 68.

Virtualization layer provides an abstraction layer from which the following examples of virtual entities may be provided: virtual servers; virtual storage; virtual networks, including virtual private networks; virtual applications and operating systems; and virtual clients.

In one example, management layer may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktops 96.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Figure 6:
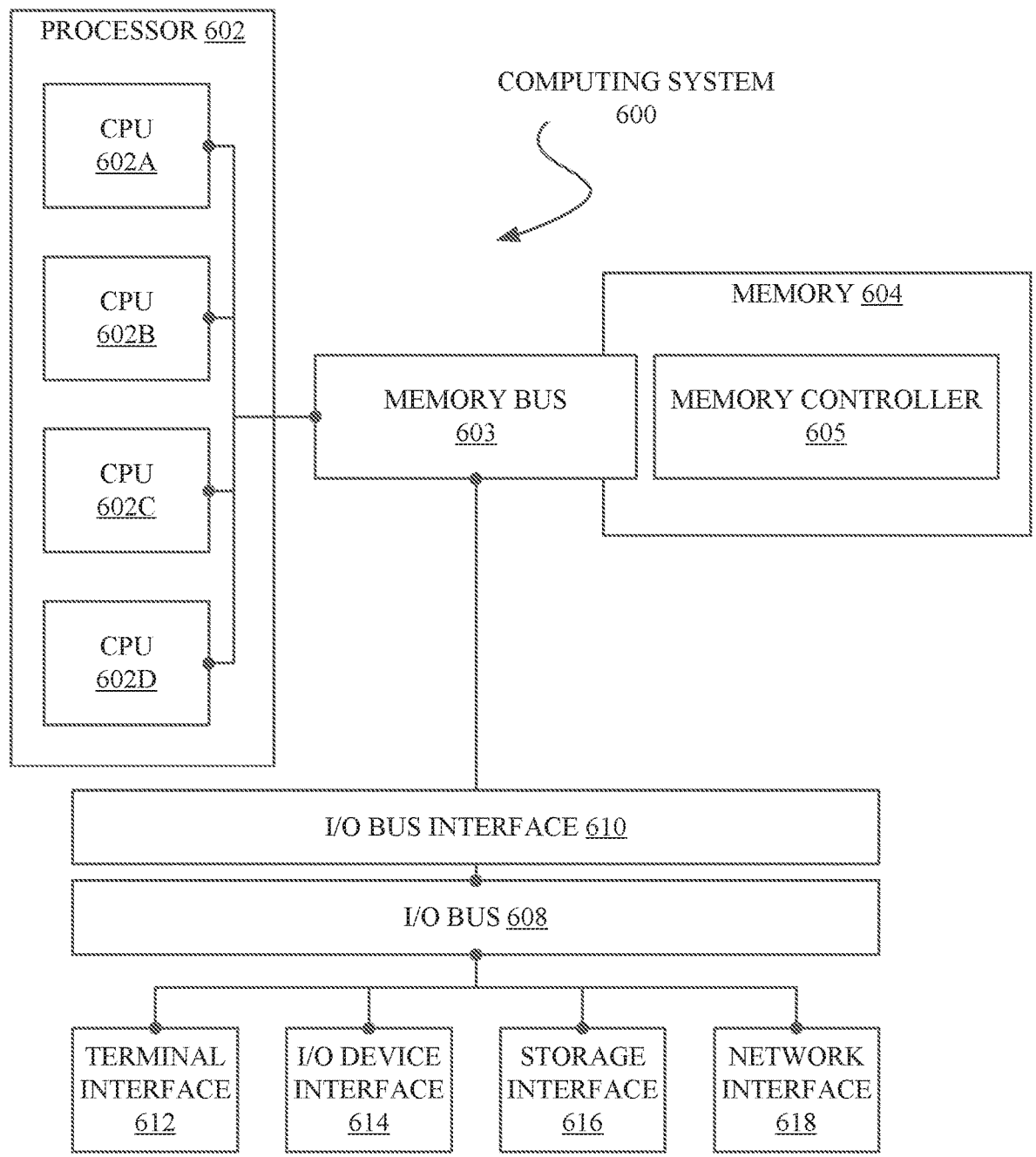
FIG. 6 is a high-level block diagram of an example computer system, according to embodiments of the present disclosure.

Referring now to FIG. 6, shown is a high-level block diagram of an example computer system (i.e., computer) 600 that may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 604, a terminal interface 612, an I/O (Input/Output) device interface 614, a storage interface 616, and a network interface 618, all of which may be communicatively coupled, directly or indirectly, for inter-component communication via a memory bus 603, an I/O bus 608, and an I/O bus interface unit 610.

The computer system 600 may contain one or more general-purpose programmable central processing units (CPUs) 602A, 602B, 602C, and 602D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 600, and may also include the virtual memory of other computer systems coupled to the computer system 600 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface, but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An automated system for item replenishment comprising:

one or more tag detection units, each tag detection unit positioned to monitor an entry/exit point of a location such that when an item passes through an entry/exit point of the location the tag detection unit tracks the item via one or more tags, wherein each tag represents one of a plurality of items, each of the one or more tags is associated with a particular consumption level of the associated item, and the one or more tags include a modifiable tag with at least a first detachable tag and a second detachable tag, and wherein the particular consumption level indicates partial consumption of a single retail item of the associated item;

a memory containing an entry/exit point of a location such that when an item passes through an entry/exit point of the location the tag detection unit tracks the item via the one or more tags;

an inventory database in communication with the one or more tag detection units and maintaining an inventory of the items currently present at the location and tracking consumption levels associated with each item, wherein the inventory database is communicatively coupled with a retailer database, and the inventory database is configured to:

receive a first indication that an item arrived at the location, wherein the first indication is received from one or more tag detection units, and the first indication is in response to the modifiable tag passing through an entry point into the location;

add, in response to receiving the first indication, the item to the inventory database, the item having an associated exhaustion date stored in the inventory database;

receive, from the one or more tag detection units, a second indication that a first consumption level of the item has been exhausted, wherein the first consumption level indicates partial consumption of the item, and the second indication is in response to the first detachable tag of the modifiable tag passing through an exit point of the location;

update, in response to receiving the second indication the exhaustion date in the inventory database;

receive, from the one or more tag detection units, a third indication that a second consumption level of the item has been exhausted, wherein the third indication is in response to the second detachable tag of the modifiable tag passing through an exit point of the location;

update, in response to receiving the third indication, the exhaustion date in the inventory database;

prepare an offer for the item in response to the exhaustion date reaching a predetermined threshold; and display the offer at the location; and a server, wherein the server determines a dynamic shipment interval based on the consumption level of the associated item and automatically initiates a shipment according to the dynamic shipment interval.

2. The system of claim 1, further comprising an interactive console permitting manual updates to the inventory of items.

3. The system of claim 1, wherein the inventory database further comprises a list of items recommended for replenishment.

4. The system of claim 3, wherein an item is placed on the list in response to the item's consumption level reaching a predetermined threshold.

5. The system of claim 4, wherein the predetermined threshold is set by a user.

6. The system of claim 4, wherein the predetermined threshold is determined according to a replenishment time associated with each item.

7. The system of claim 3, wherein each item is associated with an exhaustion date; and the list of items recommended for replenishment is populated according to the exhaustion date associated with each reaching a predetermined threshold.

8. The system of claim 1, wherein multiple tags are associated with one retail item.

9. The system of claim 1, wherein each detachable tag indicates a specific consumption level of the single retail item.

10. The system of claim 9, wherein the modifiable tag includes three detachable tags, and each of the three detachable tags indicates that one third of the single item has been exhausted.

11. The system of claim 9, wherein each detachable tag represents a sub package of the single retail item, and each sub package indicates the specific consumption level.

12. A computer program product for item refurbishment, the computer program product comprising a computer readable storage medium having program instructions embodied therewith, wherein the computer readable storage medium is not a transitory signal per se, the program instructions executable by a processor to perform a method comprising:

receiving a first indication that an item arrived at a location, wherein the first indication is received from one or more tag detection units, each tag detection unit positioned to monitor an entry/exit point of the location such that when an item passes through an entry/exit point of the location the tag detection unit tracks the item via the one or more tags, the one or more tags include a modifiable tag with at least a first detachable tag and a second detachable tag, and the first indication is in response to the modifiable tag passing through an entry point into the location;

adding the item to an inventory database, in response to receiving the first indication, the item having an associated exhaustion date stored in the inventory database, wherein the inventory database is in communication with the one or more tag detection units and is maintaining an inventory of the items currently present at the location and tracking consumption levels associated with each item;

receiving a second indication that a first consumption level of the item has been exhausted, wherein the second indication is received from the one or more tag detection units, and the first consumption level indicates partial consumption of the item, and the second indication is in response to the first detachable tag of the modifiable tag passing through an exit point of the location;

updating the exhaustion date in the inventory database, in response to receiving the second indication;

receiving a third indication that a second consumption level of the item has been exhausted, wherein the third indication is received from the one or more tag detection units, and the third indication is in response to the second detachable tag of the modifiable tag passing through an exit point of the location;

updating the exhaustion date in the inventory database, in response to receiving the third indication;

determining, by a server, a dynamic shipment interval based on a consumption level of the associated item and automatically initiating a shipment according to the dynamic shipment interval;

preparing an offer for the item in response to the exhaustion date reaching a predetermined threshold; and displaying the offer at the location.

* * * * *